United States Patent
Vurgaftman et al.

(10) Patent No.: US 9,612,398 B2
(45) Date of Patent: Apr. 4, 2017

(54) ULTRA-BROADBAND PHOTONIC INTEGRATED CIRCUIT PLATFORM AND ULTRA-BROADBAND PHOTONIC INTEGRATED CIRCUIT

(71) Applicant: The United States of America, as represented by the Secretary of the Navy, Washington, DC (US)

(72) Inventors: Igor Vurgaftman, Severna Park, MD (US); Jerry R. Meyer, Catonsville, MD (US); Martijn Heck, Aarhus (DK); Jock Bovington, San Diego, CA (US); Alexander Spott, Santa Barbara, CA (US); Eric Stanton, Santa Barbara, CA (US); John Bowers, Santa Barbara, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/884,917

(22) Filed: Oct. 16, 2015

(65) Prior Publication Data
US 2016/0109655 A1    Apr. 21, 2016

Related U.S. Application Data

(60) Provisional application No. 62/065,209, filed on Oct. 17, 2014.

(51) Int. Cl.
*G02B 6/12* (2006.01)
*G02B 6/13* (2006.01)
*G02B 6/122* (2006.01)

(52) U.S. Cl.
CPC ............. *G02B 6/13* (2013.01); *G02B 6/122* (2013.01); *G02B 6/12011* (2013.01)

(58) Field of Classification Search
CPC .......... G02B 6/43; G02B 6/4214; G02B 6/12; G02B 6/13; G02B 6/0028
See application file for complete search history.

(56) References Cited

U.S. PATENT DOCUMENTS

| | | | |
|---|---|---|---|
| 6,542,268 B1 * | 4/2003 | Rotolo | H04J 14/0204 369/44.23 |
| 8,018,597 B2 * | 9/2011 | Scott | G01J 3/02 356/451 |

FOREIGN PATENT DOCUMENTS

WO    2014047443 A1    3/2014

OTHER PUBLICATIONS

Richard A. Soref, Stephen J. Emelett, and Walter R. Buchwald, "Silicon Waveguided Components for the Long-wave Infrared Region," J. Opt. A: Pure Appl. Opt. 8, 840 (2006).

(Continued)

*Primary Examiner* — Jennifer Doan
(74) *Attorney, Agent, or Firm* — US Naval Research Laboratory; Joslyn Barritt

(57) ABSTRACT

An ultra-broadband photonic integrated circuit platform that combines at least two types of waveguides that each transmit in different, but overlapping, spectral bands on a single chip. By combining the multiple waveguides, the bandwidth of the platform can be extended beyond the bandwidth of either waveguide alone. In an exemplary embodiment, an ultra-broadband photonic integrated circuit includes a nitride-on-insulator (NOI) waveguide configured to transmit optical beams in a first spectral band and a silicon-on-nitride-on-insulator (SONOI) waveguide configured to transmit optical beams in a second band, where the same material serves as the core material in the NOI waveguide and as the cladding material in the SONOI waveguide. In some embodiments, light-emitting devices are bonded to an upper surface of the waveguides. In some embodiments, the circuit includes (Continued)

beam-combining elements so that a single beam combining all of the input wavelengths is output from the circuit.

26 Claims, 7 Drawing Sheets

(56) References Cited

OTHER PUBLICATIONS

Richard Soref, "Mid-infrared photonics in silicon and germanium," Nature Photonics 4, No. 8 (2010): 495-497.
Di Liang, Marco Fiorentino, Shane T. Todd, Geza Kurczveil, Raymond G. Beausoleil, and John E. Bowers, "Fabrication of Silicon-on-Diamond Substrate and Low-Loss Optical Waveguides," IEEE Phot. Tech. Lett. 23, 657 (2011).
Tom Baehr-Jones, Alexander Spott, Rob Ilic, Andrew Spott, Boyan Penkov, William Asher, and Michael Hochberg, "Silicon-on-sapphire integrated waveguides for the mid-infrared, " Optics Express 18, No. 12 (2010): 12127-12135.
Saeed Khan, Jeff Chiles, Jichi Ma, and Sasan Fathpour, "Silicon-on-nitride waveguides for mid-and near-infrared integrated photonics," Applied Physics Letters 102, No. 12 (2013): 121104.
Jared F. Bauters, Michael L. Davenport, Martijn J. R. Heck, John Gleason, Arnold Chen, Alexander W. Fang, and John E. Bowers, "Integration of Ultra-Low-Loss Silica Waveguides with Silicon Photonics," Proc. IEEE Photonics Conf. (Burlingame CA, 2012).
Gela Kipshidze, Takashi Hosoda, Wendy L. Sarney, Leon Shterengas, and Gregory Belenky, "High-Power 2.2-µm Diode Lasers With Metamorphic Arsenic-Free Heterostructures," IEEE Phot. Tech. Lett. 23, 317 (2011).
Igor Vurgaftman, Chadwick L. Canedy, Chul Soo Kim, Mijin Kim, William W. Bewley, James R. Lindle, Joshua Abell, and Jerry R. Meyer, "Mid-Infrared Interband Cascade Lasers Operating at Ambient Temperatures," New J. Phys. 11, 125015 (2009).
Y. Bai, N. Bandyopadhyay, S. Tsao, S. Slivken, and M. Razeghi, "Room temperature quantum cascade lasers with 27% wall plug efficiency," Appl. Phys. Lett. 98, 118102 (2011).
Alexander W. Fang, Hyundai Park, Oded Cohen, Richard Jones, Mario J. Paniccia, and John E. Bowers, "Electrically Pumped Hybrid AlGaInAs-Silicon Evanescent Laser," Opt. Expr. 14, 9203 (2006).
Hsu-Hao Chang, Ying-hao Kuo, Richard Jones, Assia Barkai, and John E. Bowers. "Integrated hybrid silicon triplexer," Optics Express 18, No. 23 (2010): 23891-23899.
Jeff Chiles, Saeed Khan, Jichi Ma, and Sasan Fathpour, "High-contrast, all-silicon waveguiding platform for ultra-broadband mid-infrared photonics," Applied Physics Letters 103, No. 15 (2013): 151106.
Long Chen, Christopher R. Doerr, Young-Kai Chen, and Tsung-Yang Liow, "Low-Loss and Broadband Cantilever Couplers Between Standard Cleaved Fibers and High-Index-Contrast Si3N4 or Si Waveguides," IEEE Phot. Tech, Lett. 22, 1744 (2010).
Martijn J. Heck, Jared F. Bauters, Michael L. Davenport, Jonathan K. Doylend, Siddharth Jain, Géza Kurczveil, Sudharsanan Srinivasan, Yongbo Tang, and John E. Bowers, "Hybrid silicon photonic integrated circuit technology," IEEE Journal of Selected Topics in Quantum Electronics 19, No. 4 (2013).
Matthew N. Sysak, Di Liang, Richard Jones, Geza Kurczveil, Molly Piels, Marco Fiorentino, Raymond G. Beausoleil, and John E. Bowers, "Hybrid Silicon Laser Technology: A Thermal Perspective," IEEE J. Sel. Topics Quant. Electron. 17, 1490 (2011).
Géza Kurczveil, Martijn J. R. Heck, Jonathan D. Peters, John M. Garcia, Daryl Spencer, and John E. Bowers, "An Integrated Hybrid Silicon Multiwavelength AWG Laser," IEEE J. Sel. Topics Quant. Electron. 17, 1521 (2011).
Eric J. Stanton, Martijn J. R. Heck, Jock Bovington, Alexander Spott, and John E. Bowers, "Multi-octave spectral beam combiner on ultra-broadband photonic integrated circuit platform," OSA Optics Express, vol. 23, No. 9, pp. 11272-11283 (2015).

\* cited by examiner

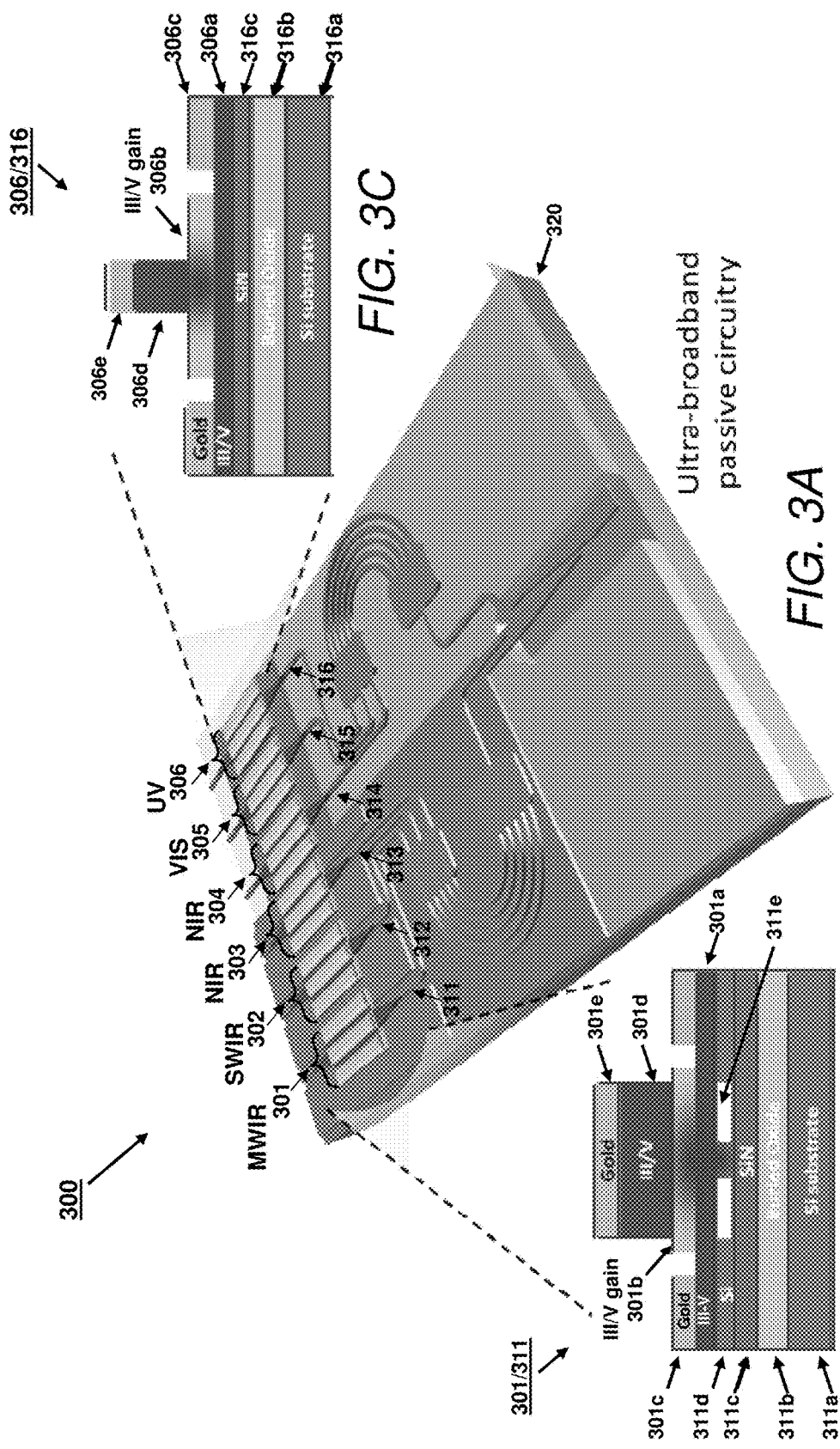

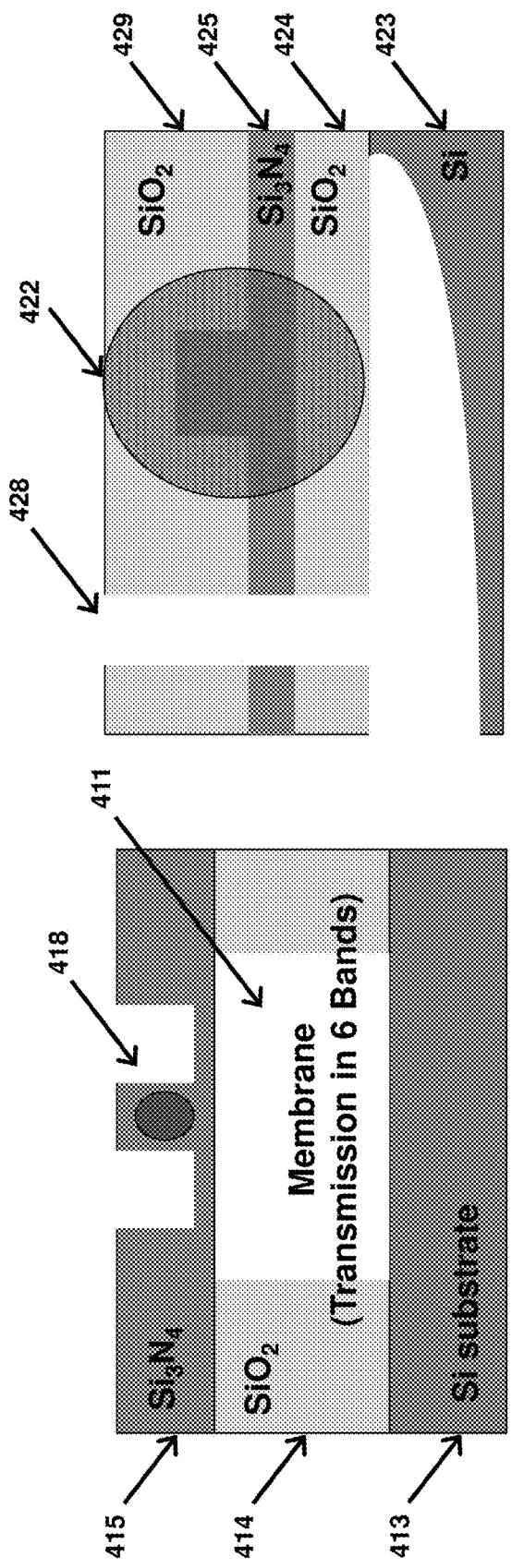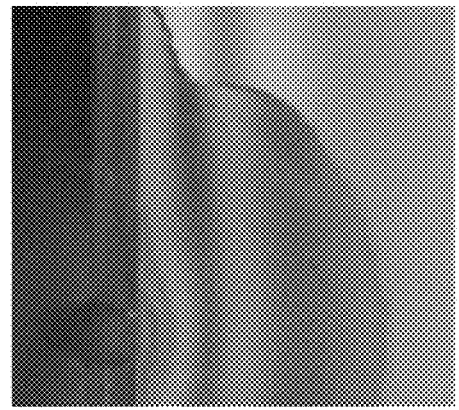
FIG. 4A
FIG. 4B
FIG. 4C

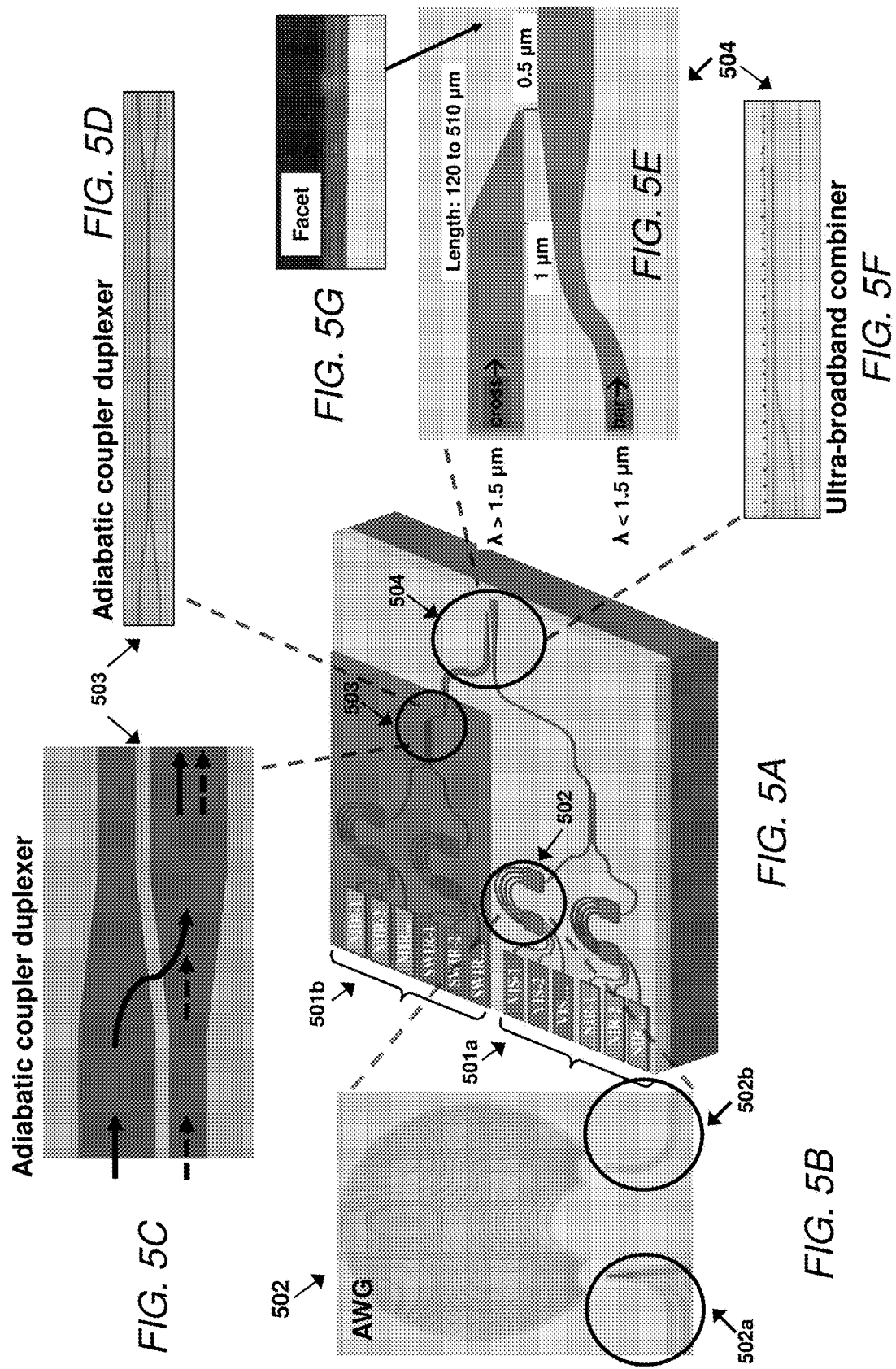

ULTRA-BROADBAND PHOTONIC INTEGRATED CIRCUIT PLATFORM AND ULTRA-BROADBAND PHOTONIC INTEGRATED CIRCUIT

CROSS-REFERENCE

This application is a Non-provisional of, and claims the benefit of priority under 35 U.S.C. §119 based on, U.S. Provisional Patent Application No. 62/065,209 filed on Oct. 17, 2014, the entirety of which is incorporated into the present disclosure.

TECHNICAL FIELD

The present invention relates to optical devices, particularly to ultra-broadband optical waveguides, beam combiners/splitters, sources that can emit at a wide range of wavelengths, and photonic integrated circuits.

BACKGROUND

Ultra-broadband optical devices that can operate at wavelengths ranging from the ultra-violet (UV) to the long-wave infra-red (LWIR) have numerous applications, for example, in spectroscopy, in countermeasures for defense technology, and as sensors for gas tracing. Such devices need to be able to generate, modulate, process (filter, split, and/or combine) and/or detect optical signals at a wide range of wavelengths. Currently, such systems are typically composed of discrete fiber-optic or bulk optic elements, with each separate element operating at a different wavelength range. It would be advantageous to integrate multiple devices on a single optical chip that can handle a wide range of optical signals.

A brief discussion of the existing technology is set forth below.

Silicon, silicon oxide, and silicon nitride are the most widely used materials for passive photonic integrated circuits. However, the bandwidth of waveguides made in these materials is limited, and no single combination of waveguide materials spans the full desired range of UV to LWIR. See Richard A. Soref, Stephen J. Emelett, and Walter R. Buchwald, "Silicon Waveguided Components for the Long-wave Infrared Region," *J. Opt. A: Pure Appl. Opt.* 8, 840 (2006); and Richard Soref, "Mid-infrared photonics in silicon and germanium," *Nature Photonics* 4, no. 8 (2010): 495-497.

More specifically, silicon nitride-on-insulator (NOI) waveguides with silicon oxide cladding have been employed to cover the 0.3 µm to 2.0 µm wavelength range, while silicon-on-insulator (SOI) technology has been used to cover the 1.1 µm to 3.5 µm range. However, the silicon oxide cladding limits the SOI transmission at longer wavelengths, and so in some cases it can be replaced by other materials, e.g., diamond, sapphire or silicon nitride, to extend the range of transmitted wavelengths. See Di Liang, Marco Fiorentino, Shane T. Todd, Geza Kurczveil, Raymond G. Beausoleil, and John E. Bowers, "Fabrication of Silicon-on-Diamond Substrate and Low-Loss Optical Waveguides," *IEEE Phot. Tech. Lett.* 23, 657 (2011); Tom Baehr-Jones, Alexander Spott, Rob Ilic, Andrew Spott, Boyan Penkov, William Asher, and Michael Hochberg, "Silicon-on-sapphire integrated waveguides for the mid-infrared," *Optics Express* 18, no. 12 (2010): 12127-12135; and Saeed Khan, Jeff Chiles, Jichi Ma, and Sasan Fathpour, "Silicon-on-nitride waveguides for mid- and near-infrared integrated photonics," *Applied Physics Letters* 102, no. 12 (2013): 121104.

SOI and silicon nitride waveguides can be combined on a single chip, as shown in Jared F. Bauters, Michael L. Davenport, Martijn J. R. Heck, John Gleason, Arnold Chen, Alexander W. Fang, and John E. Bowers, "Integration of Ultra-Low-Loss Silica Waveguides with Silicon Photonics," *Proc. IEEE Photonics Conf.* (Burlingame Calif., 2012). This work also reported mode converters to couple the light from the silicon waveguide to the silicon nitride waveguide. However, since silicon oxide is the cladding for both waveguides, the transmission window is limited to the silicon oxide bandwidth (taking into account that only the exponential tail of the waveguide mode overlaps with the silicon oxide).

Compound semiconductor laser diodes can be suitable optical sources because they can emit over a wide wavelength range, depending on material composition and epitaxial design. Typically, gallium nitride lasers operate in the blue to UV range, gallium arsenide in the red to near-infrared (NIR) range, indium phosphide in the 1.2-2 µm range, InGaAsSb in the 2-3 µm range (see Gela Kipshidze, Takashi Hosoda, Wendy L. Sarney, Leon Shterengas, and Gregory Belenky, "High-Power 2.2-µm Diode Lasers With Metamorphic Arsenic-Free Heterostructures," *IEEE Phot. Tech. Lett.* 23, 317 (2011)); interband cascade lasers (ICLs) in the 3-4 µm range (see Igor Vurgaftman, Chadwick L. Canedy, Chul Soo Kim, Mijin Kim, William W. Bewley, James R. Lindle, Joshua Abell, and Jerry R. Meyer, "Mid-Infrared Interband Cascade Lasers Operating at Ambient Temperatures," *New J. Phys.* 11, 125015 (2009)); and quantum cascade lasers (QCLs) in the 4-10 µm range (see Y. Bai, N. Bandyopadhyay, S. Tsao, S. Slivken, and M. Razeghi, "Room temperature quantum cascade lasers with 27% wall plug efficiency," *Appl. Phys. Lett.* 98, 118102 (2011)). Although these classes of semiconductor laser are in some ways conceptually similar, the conventional methods used to fabricate lasers emitting in diverse spectral regions employ a wide range of materials, substrates, and epitaxial layer designs, which has prevented the monolithic integration of these lasers onto a single chip.

Heterogeneous integration, i.e., combining different materials on a single chip by means of wafer or die bonding, can in principle allow different materials to be combined in a photonic integrated circuit. For example, a laser epitaxial wafer or die can be bonded to a processed silicon chip, see Alexander W. Fang, Hyundai Park, Oded Cohen, Richard Jones, Mario J. Paniccia, and John E. Bowers, "Electrically Pumped Hybrid AlGaInAs-Silicon Evanescent Laser," *Opt. Expr.* 14, 9203 (2006); or silicon nitride circuit, see WO 2014/047443 A1, "Integrated dielectric waveguide and semiconductor layer and method therefor." In this way, sources can be added to the passive silicon or silicon nitride photonic integrated circuits. Different-bandgap materials can be integrated by using selective area bonding. See Hsu-Hao Chang, Ying-hao Kuo, Richard Jones, Assia Barkai, and John E. Bowers. "Integrated hybrid silicon triplexer," *Optics Express* 18, no. 23 (2010): 23891-23899.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a novel ultra-broadband photonic integrated circuit platform whose optical transmission bandwidth substantially exceeds those of existing photonic integration platforms. An ultra-broadband photonic integrated circuit platform in accordance with the present invention combines at least two types of waveguides on a single chip, where the waveguides are configured to transmit in different, but overlapping, spectral bands. Each of the waveguides comprises a heterostructure having a bottom cladding layer, a core, and a top cladding layer. In accordance with the present invention, the same material layer forms the bottom cladding layer of one waveguide and the core layer of an adjacent waveguide.

By combining the multiple waveguides on a single platform, the bandwidth of the platform can be extended beyond the bandwidth of either waveguide alone.

In an exemplary embodiment, an ultra-broadband photonic integrated circuit platform in accordance with the present invention includes a nitride-on-insulator (NOI) waveguide configured to transmit optical beams in a first spectral band ("Band 1") and a silicon-on-nitride-on-insulator (SONOI) waveguide configured to transmit optical beams in a second spectral band ("Band 2"), where the same $Si_3N_4$ material layer serves as the core material in the NOI waveguide and as the cladding material in the SONOI waveguide.

An ultra-broadband photonic integrated circuit platform in accordance with the present invention can be used to realize an ultra-broadband photonic integrated circuit comprising two or more waveguide circuits operating at different wavelengths on a single chip.

In some embodiments of an ultra-broadband photonic integrated circuit in accordance with the present invention, light-emitting devices such as III/V lasers can be mounted on top of the NOI and SONOI waveguides. In such embodiments, the combined laser/SONOI structures form "hybrid" waveguides in which the III/V material is part of the waveguide and the III/V-SONOI stack forms the laser gain medium so that the lasing mode is shared between the III/V semiconductor layers and the underlying SONOI structure.

In some embodiments, an ultra-broadband photonic integrated circuit in accordance with the present invention can include beam-combining elements that can receive the Band 1 and Band 2 beams transmitted from the waveguides and produce a single output beam combining all of the wavelengths in Band 1 and Band 2.

Fabrication methods for an ultra-broadband photonic integrated circuit platform and ultra-broadband photonic integrated circuit are also described, along with options for integrating optical sources covering a broad range of wavelengths.

BRIEF DESCRIPTION OF THE DRAWINGS

FIGS. 3A-3C are schematic diagrams illustrating aspects of an exemplary embodiment of a photonic integrated circuit architecture in accordance with the present invention, comprising multiple silicon-based waveguide and beam-combining components, together with compound semiconductor laser elements that emit in multiple spectral bands, all heterogeneously integrated on a single chip to form an ultra-broadband photonic integrated circuit.

FIGS. 4A-4C illustrate aspects of exemplary waveguide configurations that can support the transmission of an ultra-broad wavelength range in accordance with the present invention.

FIGS. 5A-5G are top-view schematic diagrams illustrating exemplary beam-combining aspects of an ultra-broadband photonic integrated circuit in accordance with the present invention.

DETAILED DESCRIPTION

Figure 1A:
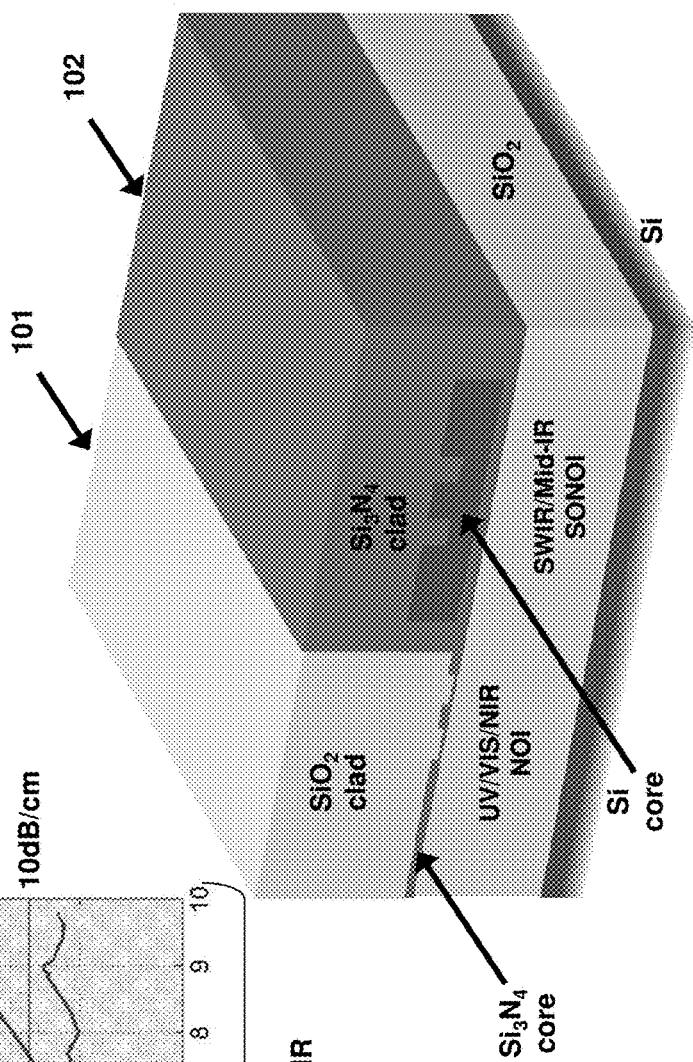
FIG. 1A illustrates the spectral dependences of typical material losses for the primary waveguide core and cladding materials available for photonic integrated circuit fabrication using CMOS processing.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides an ultra-broadband photonic integrated circuit platform and ultra-broadband photonic integrated circuit which solve two of the main difficulties that currently prevent the fabrication of an ultra-broadband optical source on a single chip: first, how to combine spectral sources that span an optical bandwidth larger than is compatible with the use of only nitride-on-insulator ("NOI") waveguides having an $Si_3N_4$ core and $SiO_2$ clad or only silicon-on-nitride-on-insulator ("SONOI") waveguides having a Si core and an $Si_3N_4$ clad, and second, how to combine the output of such a wide range of optical sources into a single, high-quality (nearly single mode and low $M^2$, i.e., close to the diffraction limit) output beam with low loss. Such a circuit in accordance with the present invention can be used for high-power applications such as optical countermeasures as well as for defense and commercial spectroscopy applications such as chemical and biological sensing.

The present disclosure provides a novel methodology for integrating a wide range of optical sources having wavelengths extending from the UV to the midwave infrared (MWIR) or possibly long-wave infrared (LWIR) onto a single chip, describes how these widely varying sources can be combined into a single output waveguide, and describes exemplary embodiments of devices employing such methodology. It should be understood that the optical beam referred to as the "output" here and below may either be emitted from the chip as an ultra-broadband beam, or remain on the chip for input to additional photonic integrated circuits or devices that also reside on the same chip.

As used in the present disclosure, the term "ultra-broadband photonic integrated circuit platform" often refers to the waveguide architecture described herein, in which multiple waveguides that transmit light in different, but overlapping, wavelength bands are fabricated on a single chip, wherein a single material layer forms a bottom cladding layer for one waveguide and a core for an adjacent waveguide on the chip. The term "ultra-broadband photonic integrated circuit" often refers to such an ultra-broadband photonic integrated circuit platform where the waveguides are combined with one or more active or passive optoelectronic device elements to provide multiple waveguide circuits, operating at different wavelengths, on a single chip. By combining the multiple waveguides, the bandwidth of the platform can be extended beyond the bandwidth of either waveguide alone.

In general terms, an ultra-broadband photonic integrated circuit platform in accordance with the present invention comprises at least two types of waveguides that each transmit in different, but overlapping, spectral bands on a single chip. For convenience, we will assume typical wavelength ranges for the different spectral bands of roughly 10-380 nm for ultraviolet (UV), 380-750 nm for visible light (VIS), 750-2000 nm for near-infrared (NIR), 2000-3000 nm for shortwave infrared (SWIR), 3000-8000 nm for midwave infrared (MWIR), and 8000-15000 nm for long-wave infrared (LWIR). However, one skilled in the art will readily appreciate that the present invention does not depend in any way on a specific definition of the wavelength ranges for each band.

An exemplary embodiment illustrating the principles employed in an ultra-broadband photonic integrated circuit platform in accordance with the present invention is described below. In this exemplary embodiment, the structure of one waveguide is configured to transmit multiple optical beams in a first spectral band ("Band 1") consisting of wavelengths in the UV-NIR range, while the structure of a second waveguide is configured to transmit multiple optical beams in a second spectral band ("Band 2") consisting of wavelengths in the NIR-MWIR range. It should be noted here that the designations of the wavelength bands for Band 1 and Band 2 are arbitrary, and other wavelength bands may be designated as Band 1 and/or Band 2, e.g., as described below with respect to FIGS. 2 and 3.

Each waveguide in an ultra-broadband photonic integrated circuit platform in accordance with the present invention comprises a heterostructure, typically composed of a bottom cladding layer, a top cladding layer that may or may not comprise the same material as the bottom cladding layer, and an intermediate core layer sandwiched between the top and bottom cladding layers, where the same material layer forms the bottom cladding layer of one waveguide and the core layer in an adjacent waveguide. The core layer may be patterned to provide lateral confinement of the optical mode in the waveguide, though in some cases it may be in the form of a solid slab of material. In some embodiments, the top and/or bottom cladding layers could also be air.

A typical waveguide heterostructure in an ultra-broadband photonic integrated circuit platform and ultra-broadband photonic integrated circuit in accordance with the present invention has the following characteristics.

In a waveguide suitable for transmission of wavelengths in Band 1, the refractive index of the material comprising the core layer is higher than that of the top and bottom cladding layers in the waveguide structure so that the core layer confines the light having wavelengths in Band 1 within the waveguide. The core and cladding layers in waveguides intended for use in Band 1 can be somewhat absorbing (i.e., lossy) at wavelengths in Band 2, but should have low loss within Band 1 to permit light having wavelengths within that Band to propagate across all or part of the photonic circuit without appreciable degradation of its optical intensity. Similarly, the core and cladding materials intended for use in Band 2 must have low loss within that band, but can absorb more strongly at wavelengths in Band 1.

The three layers in each waveguide can be uniform bulk layers or can be composite layers consisting of sub-layers formed from different materials, e.g., materials containing quantum wells and/or metamaterials, and can be formed by any suitable technique known in the art, such as by epitaxial growth, CVD, or wafer bonding. If each of these sub-layers has a thickness much smaller than the optical wavelength, the composite layers form an effective medium characterized by an appropriately averaged index.

In some embodiments, one or more silicon-on-insulator (SOI) waveguides can be used to guide the transmission of light having wavelengths in the intermediate spectral band of 1.1-3.5 μm. However, NOI and SONOI waveguides are often preferred for use in a photonic integrated circuit in accordance with the present invention since they jointly cover an expanded wavelength range while retaining full compatibility with CMOS processing. By using CMOS processing, the surface of a single chip can be arbitrarily segmented into side-by-side regions having either NOI or SONOI waveguides as in the embodiment shown in FIG. 1B described below. As a result, any suitable CMOS processing method known in the art can be used to fabricate these waveguides for use in passive circuits such as gratings, ring-based filters, arrayed-waveguide gratings, splitters, and combiners, and by careful design and choice of constituent materials, these elements can be made to operate in a broad range of spectral bands.

The design of each waveguide in an ultra-broadband photonic integrated circuit platform and ultra-broadband photonic integrated circuit in accordance with the present invention is informed by the transmission losses exhibited by various candidate constituent materials. For waveguides to be used in a given spectral band, the core must have a higher refractive index than the top and bottom cladding layers, and both core and cladding layers must have low loss. Although the following discussion is presented in the context of NOI waveguides configured to transmit wavelengths in Band 1 and SONOI waveguides configured to transmit wavelengths in Band 2, one skilled in the art would readily appreciate that the same analysis can be used to design waveguides formed from other constituents that are suitable for transmission of optical signals in the same or other bands of interest.

Figure 1B:
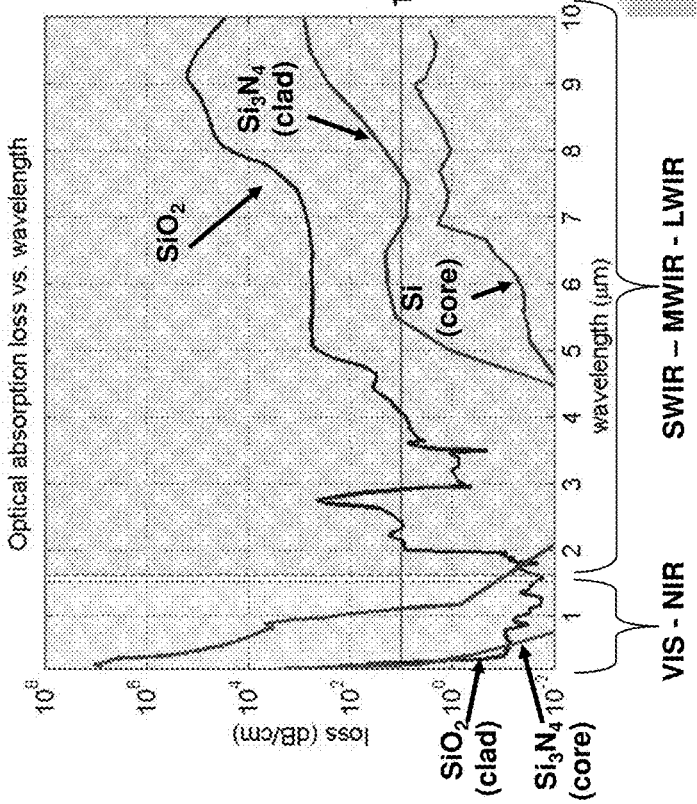
FIG. 1B is a schematic illustrating aspects of an exemplary waveguide architecture that provides low-loss propagation at all UV to midwave infrared (MWIR) wavelengths in the ultra-broadband photonic integrated circuit in accordance with the present invention.

FIGS. 1A and 1B provide further illustration of the general principles employed in an ultra-broadband photonic integrated circuit platform and ultra-broadband photonic integrated circuit in accordance with the present invention.

FIG. 1A is a plot showing typical transmission losses of Si, $SiO_2$, and $Si_3N_4$ at wavelengths ranging from about 0.2 μm to 10 μm. It should be understood that the losses shown in this figure are only examples indicating the expected trends, whereas the actual losses occurring in specific processed device structures may differ because they are quite sensitive to the processing procedures used to fabricate materials for the specific structure and application. As can be seen from the plot, at wavelengths shorter than about 1.4 μm, Si exhibits high transmission loss, whereas $Si_3N_4$ exhibits significantly less loss. $SiO_2$ exhibits lower losses than $Si_3N_4$ at the shortest wavelengths in this range but higher loss at wavelengths greater than about 0.5 μm. At wavelengths above about 1.4 μm, i.e., at wavelengths in the SWIR, MWIR, and LWIR ranges, Si exhibits a lower loss than $Si_3N_4$, while $SiO_2$ exhibits a much higher loss than either Si or $Si_3N_4$.

Thus, although $SiO_2$ can be used as a cladding material for waveguides at shorter wavelengths, because of its high transmission losses, it is not a suitable cladding material for waveguides where transmission of longer wavelengths is desired. On the other hand, the very wide transmission bandwidth of $Si_3N_4$ makes it suitable for use in both waveguides, i.e., as the core material in the NOI waveguide, which transmits in the UV-NIR (Band 1) wavelength range described above, and as the cladding material in the SONOI waveguide, which transmits in the NIR-MWIR (Band 2) wavelength range.

This is illustrated in the exemplary structure shown in FIG. 1B, which shows a combined waveguide structure in accordance with the present invention, comprising NOI waveguide 101 and SONOI waveguide 102 on a single Si chip, where NOI waveguide 101 has an $Si_3N_4$ core and a $SiO_2$ top cladding layer, while the SONOI waveguide 102 has a Si core embedded within the $Si_3N_4$ material. A single buried $SiO_2$ layer extends underneath the combined width of both waveguides, but the SONOI waveguide is designed in such a way that only a small or negligible fraction of the optical mode propagating in the SONOI waveguide extends into that layer since it absorbs in Band 2. By using $Si_3N_4$ instead of $SiO_2$ as the cladding material for the Si core in the SONOI waveguide, the optical bandwidth of the SONOI waveguide is increased substantially. Those skilled in the art will readily recognize that, in other embodiments, SONOI waveguide configurations that differ from the geometry shown in FIG. 2, but which still employ a Si core and $Si_3N_4$ cladding layer(s), may also be employed in an ultra-broadband photonic integrated circuit in accordance with the present invention, and such different configurations and embodiments are deemed to be within the scope of the present disclosure.

It should be noted that although some embodiments, such as those illustrated in FIG. 3B described below, employ NOI waveguides for Band 1 and SONOI waveguides for Band 2, in other embodiments, waveguides fabricated from other materials can be used. For example, in some embodiments, the top or bottom cladding layer can be titanium oxide, aluminum oxide, or tantalum pentoxide. In other embodiments, the core layer can be germanium, the top cladding layers can be silicon, silicon oxide, silicon nitride, or air, and the bottom cladding layer can be silicon, silicon oxide, silicon nitride, aluminum oxide, or titanium oxide. In still other embodiments, the structure can include an additional layer in the cladding to allow the transmission of light in one or more additional waveguide bands, for example, including a layer of III/V material or germanium on a SONOI waveguide. In some embodiments, additional waveguides can also be present on the chip, where the additional waveguides are configured to transmit wavelengths in a wavelength band that may or may not overlap the wavelength band transmitted by the other waveguides on the chip.

The principles used in a combined NOI and SONOI structure for an ultra-broadband passive photonic integrated circuit platform in accordance with the present invention and techniques for fabrication thereof will now be described with respect to the exemplary embodiment illustrated in FIG. 2.

Figure 2:
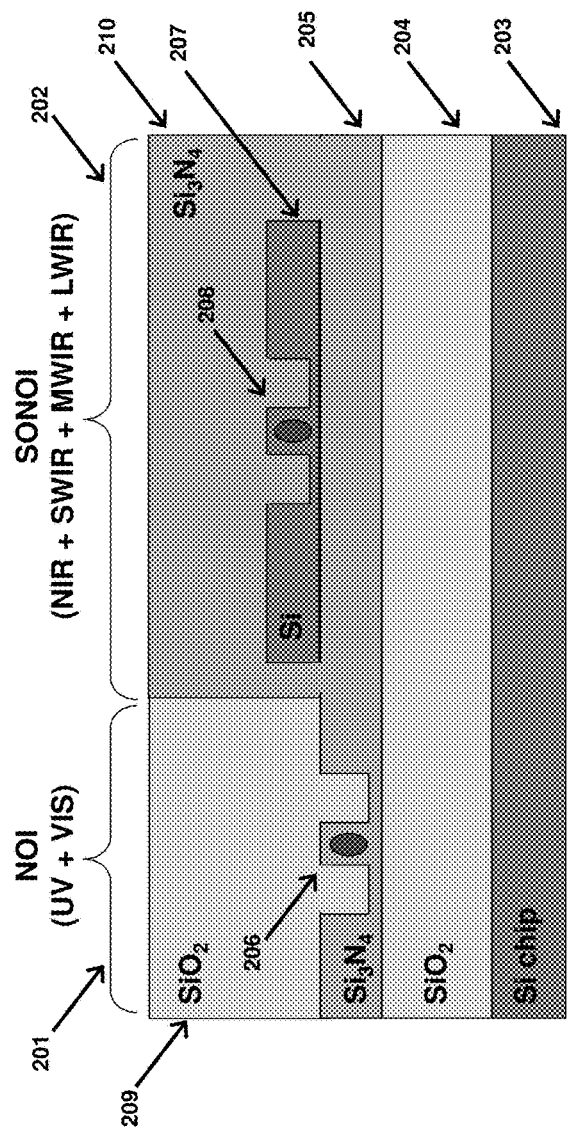
FIG. 2 is a cross-sectional view schematic diagram further illustrating aspects of an exemplary bare waveguide architecture for an ultra-broadband photonic integrated circuit in accordance with the present invention.

FIG. 2 is a cross-sectional view schematic diagram illustrating aspects of an exemplary bare waveguide architecture for an ultra-broadband photonic integrated circuit platform in accordance with the present invention. As noted above, the present invention takes advantage of the transmission properties of $SiO_2$ and $Si_3N_4$ at different wavelengths by employing a layered stack structure comprising an NOI structure combined with an SONOI structure on a single chip as in FIG. 1B. Such a configuration allows waveguides having low losses in multiple bands to be fabricated on a single chip, where the waveguides in each segment of the chip are configured to transmit optical signals in a specified wavelength range.

It will be noted here that as described above, the wavelength ranges for "Band 1" and "Band 2" as those terms are used herein are arbitrary and do not have any set meaning apart from the functional requirements imposed by the spectral regions over which the various material constituents, as they are fabricated for a given photonic integrated circuit, have losses sufficiently low to meet the desired performance specifications. For example, for the purposes of FIG. 2 and FIGS. 3A-3C described below, the term "Band 1" is used to refer to wavelengths in the UV-VIS-NIR range, while "Band 2" is used to refer to wavelengths in the NIR-SWIR-MWIR-LWIR.

Thus, as shown in FIG. 2, an ultra-broadband photonic integrated circuit platform in accordance with the present invention can include NOI waveguide structure 201 and SONOI waveguide structure 202 on a single Si chip 203. The fabrication process of such a structure begins with the deposition of an $SiO_2$ bottom layer 204 on a silicon chip 203 by means of thermal oxidation or any other suitable technique known in the art. $Si_3N_4$ layer 205 is then deposited on $SiO_2$ layer 204, where $Si_3N_4$ layer 205 serves as the core layer in the NOI waveguide and the bottom cladding layer in the SONOI waveguide. One or more waveguides 206, configured to guide the transmission of light in Band 1, are then formed in a first area of $Si_3N_4$ layer 205, e.g., by optical lithography or any other suitable process. Si layer 207, which serves as the core of SONOI waveguide 201 is then deposited on a second area of $Si_3N_4$ layer 205, e.g., by means of wafer bonding using a wafer that includes a handle substrate, an etch stop layer or separation layer (e.g., an ion implanted layer). One or more waveguides 208 configured to guide the transmission of light in Band 2 are then formed in Si layer 207.

The regions comprising the NOI and SONOI structures are then defined, e.g., by optical lithography or any other suitable method, and any portion of Si layer 207 in the region defining the NOI structure is removed. $SiO_2$ layer 209 is then deposited over $Si_3N_4$ layer 205 in NOI region 201 and $Si_3N_4$ layer 210 is deposited over $Si_3N_4$ layer 205 and Si layer 207 in SONOI region 202 to surround the Si core layer 207 and complete the fabrication of the combined structure. In an alternative embodiment, $Si_3N_4$ may be deposited on an oxidized Si wafer and bonded to a Si layer. The Si layer that would lie above the nitride layer is then removed, e.g., by etching, after which the NOI waveguides are etched. In addition, in some embodiments, it may be possible to deposit lower loss-$Si_3N_4$ for MWIR and LWIR wavelengths other than those shown in FIG. 1A by low pressure chemical vapor deposition (LPCVD).

In some embodiments, transmission of three or more broad wavelength bands can be accomplished by means of three or more suitably configured waveguides composed of different core and cladding materials combined on the same chip, where the same material serves as the core of the first waveguide and the cladding of the second, the core material of the second waveguide serves as the cladding of the third, and so on. For example, the structure illustrated in FIG. 2 can be extended laterally and a third waveguide can be defined, where the third waveguide has a germanium core deposited on silicon layer 207, where silicon layer 207 serves as the bottom cladding layer with an additional silicon layer deposited so as to surround the germanium core layer. In still other embodiments, each waveguide in the combined waveguide structure can be configured to transmit in a narrower wavelength band, e.g., with one waveguide transmitting in the UV band, one transmitting in the visible (VIS) band, one transmitting in the NIR band, etc.

In other embodiments, a structure can be formed on top of one or more of the Band 1 or Band 2 waveguides in order to form an ultra-broadband photonic integrated circuit having active functionality such as gain, modulation, or photo-detection functionality. Formation of the additional structures can be achieved by any suitable technique such as epitaxial growth or wafer bonding. Fabrication of any active optical elements and their coupling to the passive Band 1 and/or Band 2 circuitry can also be done by using well-known approaches such as those used in the hybrid silicon platform described in Martijn J. Heck, Jared F. Bauters, Michael L. Davenport, Jonathan K. Doylend, Siddharth Jain, Géza Kurczveil, Sudharsanan Srinivasan, Yongbo Tang, and John E. Bowers, "Hybrid silicon photonic integrated circuit technology," *IEEE Journal of Selected Topics in Quantum Electronics* 19, no. 4 (2013) ("Heck 2013"). In some embodiments, the fabrication process can also include further processing, e.g., using techniques of ion implantation and/or metal deposition, to add electro-optic and/or thermo-optic functionalities, such as silicon-based carrier injection/depletion modulation or silicon nitride-based thermo-optic phase shifting, to the circuit.

Materials that can be added to the Band 1 and/or Band 2 circuits to create the desired functionality include group III/V or group II/VI compound semiconductors, germanium, rare-earth doped materials, or any other suitable material known in the art, where the materials used for the Band 1 and/or Band 2 circuits can be the same or different. In some embodiments, at least two different materials can be used to form active components operating at different wavelengths on top of the Band 1 and Band 2 circuitry. In such a case, the bonding of the different materials can be achieved by use of selective dies and/or selective die bonding.

In some embodiments, one or more unprocessed dies of the same or different other materials that emit light or have some other function that is more effectively accomplished by a material that is not silicon-based can be attached to the top of the silicon-based chip that has already been processed to contain the waveguides and other passive elements discussed above. The dies may be attached to the silicon-based chip containing the waveguides and other passive elements by epitaxial growth, wafer bonding, see Fang et al., supra, or any other suitable method known in the art. The unprocessed dies may be constructed from III/V, II/VI, or IV/VI semiconductor materials, or other functional optoelectronic materials known in the art. Examples of III/V light-emitting materials include nitride-based semiconductor hetero structures that usually emit in the UV and visible spectral bands; gallium arsenide semiconductor heterostructures that usually emit in the visible and NIR spectral bands; indium phosphide-based semiconductor heterostructures that usually emit in the NIR, SWIR, MWIR, or LWIR spectral bands; and GaSb-based semiconductor hetero structures that usually emit in the SWIR, MWIR, and LWIR spectral bands.

In some embodiments the additional light-emitting or other functional materials can be deposited on similar substrates, using similar total layer thicknesses to enable more efficient fabrication. Examples include the formation of QW laser and QCL active components, both starting with wafers based on indium phosphide substrates, for simultaneous substrate removal, and the use of equal mesa heights for simultaneous mesa etching.

In some embodiments, the same electrical contact layers are used to enable the simultaneous deposition of metals, thereby limiting the number of process steps.

Thus, by using combined waveguide structures such as the NOI/SONOI platform described above, an ultra-broadband photonic integrated circuit can be fabricated in which multiple devices emitting at different, widely spaced-apart wavelengths can be integrated onto a single chip.

In some embodiments, such as the structures illustrated in FIGS. 3A-3C described below, additional epitaxial materials can be bonded, i.e., heterogeneously integrated, to the NOI or SONOI circuitry to permit light-emitting sources spanning the UV to MWIR to be integrated onto a single chip.

Aspects of such an ultra-broadband photonic integrated circuit in accordance with the present invention are described below with respect to the exemplary embodiment depicted in FIGS. 3A-3C.

FIG. 3A is a top-view schematic diagram illustrating aspects of an exemplary embodiment of a photonic integrated circuit architecture comprising silicon-based waveguides and beam-combining components along with III/V lasers emitting in multiple spectral bands bonded on top of the chip to form an ultra-broadband photonic integrated circuit in accordance with the present invention, while FIG. 3B is a cross-sectional view schematic diagram of an exemplary SONOI waveguide with a MWIR, SWIR, or NIR III/V laser bonded on top, and FIG. 3C is a cross-sectional view schematic diagram of an exemplary NOI waveguide with a NIR, visible, or UV III/V laser bonded on top. As described in more detail below, the SONOI waveguides 301-303 and associated laser elements 311-313 form so-called "hybrid waveguides" in which the III/V material is part of the waveguide and the III/V-SONOI stack forms the laser gain medium so that the lasing mode is shared between the III/V semiconductor layers and the underlying SONOI structure. See Fang, supra (which describes shared lasing in the context of coupling to a SOI waveguide rather than a SONOI waveguide as in the present example).

As shown in FIG. 3A, an exemplary ultra-broadband photonic integrated circuit 300 includes multiple laser elements, each configured to emit in a different wavelength band, mounted on a single chip 320. Thus, photonic integrated circuit 300 includes laser elements 301-316, where each element is configured to emit in one of the MWIR (301), SWIR (302), NIR (303), NIR (304), VIS (305), and UV (306). Each of the laser elements is mounted so that its output is coupled to a corresponding SONOI waveguide 311-313 or NOI waveguide 314-316 configured to transmit with low loss at the wavelength of the laser.

FIGS. 3B and 3C are cross-sectional view schematic diagrams of such laser element/waveguide structures shown in FIG. 3A.

For example, FIG. 3B is a detailed schematic illustration of hybrid waveguide structure 301/311 configured to emit/ transmit in the MWIR range, in which laser element 301 includes electrical contacts and some form of mirrors to provide optical feedback, and associated SONOI structure 311 completes the hybrid waveguide. As shown in FIG. 3B, SONOI structure 311 comprises a Si chip 311a; a buried oxide bottom layer 311b, for example, a $SiO_2$ layer as described above; $Si_3N_4$ bottom cladding layer 311c; and Si layer 311d in which waveguide core 311e is patterned to provide the portion of the hybrid waveguide core that resides within the SONOI structure. Laser element 301 is mounted on top of SONOI structure 311, and includes III/V bottom cladding and/or separate confinement layer 301a, III/V gain layer 301b, gold or other metal bottom contact layer 301c, III/V top cladding layer 301d, and gold or other metal top contact layer 301e, with separate confinement and/or other functional layers also being included in some embodiments. In the embodiment illustrated in FIG. 3B, the III/V epilayer that is attached to the silicon chip is designed to generate a lasing optical mode that is shared between the SONOI waveguide and the active III/V material.

Similarly, FIG. 3C is a detailed illustration of laser element/waveguide structure 306/316 comprising a laser element and associated NOI waveguide structure configured to emit/transmit light in the UV wavelength band. As illustrated in FIG. 3C, structure 306/316 includes NOI structure 316 comprising Si chip 316a, buried oxide layer 316b, which functions as the bottom cladding layer of the waveguides in regions where III/V active material is not present, and $Si_3N_4$ layer 316c, which functions as the bottom cladding layer for waveguides in regions of the structure where the III/V material is present and the core for waveguides in those regions where III/V active material is not present. Note that in such a structure, a solid material is preferable for the waveguide core because of its thermal and mechanical advantages, and so, as illustrated in FIG. 3C, whereas Si layer 311d in hybrid laser element/SONOI waveguide structure 301/311 is patterned to provide waveguide core 311e, $Si_3N_4$ layer 316c in the laser element/NOI waveguide structure 306/316 is a solid $Si_3N_4$ slab. The tapers illustrated schematically in FIG. 3A may be used to transfer waveguide modes that reside mostly in the III/V material where it is present down into the NOI waveguides for propagation in regions where III/V material is not present. See Heck 2013, supra.

Also as shown in FIG. 3C, as with hybrid waveguide 301/311 shown in FIG. 3B, a UV III/V gain element 306 is mounted on top of NOI structure 316, where the gain element comprises III/V bottom cladding and/or separate confinement layer 306a, III/V gain layer 306b, gold or other metal bottom contact layer 306c, III/V top cladding layer 306d (which may include a separate confinement and/or other functional layers), and gold or other metal top contact layer 306e. In some embodiments, UV gain element 306, visible gain element 305, or NIR gain element 304 comprises a semiconductor heterostructure formed from III/V semiconductor materials such as GaN-based materials, InP-based materials, GaSb-based materials, etc., while in other embodiments, it can be formed from a II/VI material such as a ZnSe-based material. As in the embodiment illustrated in FIG. 3B, the III/V epilayer that is attached to the silicon chip is designed to provide gain that generates a lasing optical mode that resides partly or mostly in the active III/V material and may be transferred by a taper or other means to the NOI waveguide.

While each of the SONOI and NOI waveguide structures are the same, respectively, their dimensions, e.g., their widths, in different regions of the chip may be different for the waveguides configured to transmit in different wavelength ranges. In addition, the materials in the laser elements mounted on each waveguide structure can be very different to produce the laser emissions having the different wavelengths. However, using the integrated NOI/SONOI structure in accordance with the present invention, such widely varying laser elements can be integrated on a single chip.

Methods for growing and designing III/V and other active materials configured for mode-sharing have been well described in the prior art. See, e.g., Fang, supra; see also Matthew N. Sysak, Di Liang, Richard Jones, Geza Kurczveil, Molly Piels, Marco Fiorentino, Raymond G. Beausoleil, and John E. Bowers, "Hybrid Silicon Laser Technology: A Thermal Perspective," *IEEE J. Sel. Topics Quant. Electron.* 17, 1490 (2011); and Géza Kurczveil, Martijn J. R. Heck, Jonathan D. Peters, John M. Garcia, Daryl Spencer, and John E. Bowers, "An Integrated Hybrid Silicon Multiwavelength AWG Laser," *IEEE J. Sel. Topics Quant. Electron.* 17, 1521 (2011). For the photonic integrated circuit structure of this invention, it is important that the design be optimized for transferring the optical mode that resides at least partly in the III/V material entirely to the silicon-based waveguide for propagation, combination with other beams, and other functionality. Such photonic integrated circuit designs in accordance with the present invention are distinct from those for more conventional stand-alone III/V emitters and other devices that are not coupled to a silicon waveguide.

In some embodiments, the beams generated by the various laser elements must come together at the final output to produce a single output beam combining all of the input wavelengths, i.e., to produce a single output beam that contains all of the wavelengths in Band 1 and Band 2. To combine the beams originating on the NOI and SONOI segments of the chip, as described in more detail below, an ultra-broadband waveguide is required, i.e., a waveguide whose bandwidth encompasses all wavelengths in the UV to the MWIR or even LWIR bands. Neither the NOI nor SONOI waveguide types are ultra-broadband, but the combination of these waveguide types on a single chip creates an ultra-broadband platform due to the ultra-broadband transmission of $Si_3N_4$. Hence, the final output waveguide of a chip configured for ultra-broadband beam-combining must for a limited length use a single waveguide that has low loss over an ultra-broad band, where the common waveguide is kept short so as to avoid significant losses. In many cases, this can be achieved with a $Si_3N_4$ membrane waveguide described below. In other cases, if the required propagation length is short enough and the wavelengths are short enough to avoid significant losses, a nitride-on-oxide core and cladding combination, as in the NOI portion of the structure in FIG. 2, can be employed.

FIGS. 4A and 4B are schematic diagrams illustrating waveguide configurations that can be used in some embodiments of a photonic integrated circuit in accordance with the present invention to support the transmission of an ultra-broad wavelength range that includes both Band 1 and Band 2, e.g., UV to NIR and MWIR to LWIR, in accordance with the present invention, with FIG. 4A showing a membrane waveguide with a $Si_3N_4$ core and air cladding layers, and FIG. 4B showing a $Si_3N_4$ core with $SiO_2$ cladding layers.

FIG. 4A illustrates aspects of an exemplary embodiment of such a common output waveguide, i.e., a $Si_3N_4$ membrane waveguide, that can be used where the coupler can be made from $Si_3N_4$ only. See Jeff Chiles, Saeed Khan, Jichi Ma, and Sasan Fathpour, "High-contrast, all-silicon waveguiding platform for ultra-broadband mid-infrared photonics,"

*Applied Physics Letters* 103, no. 15 (2013): 151106. Thus, if the bottom cladding layer of a NOI waveguide is removed altogether or is very thin, the waveguide becomes a membrane waveguide such as the waveguide shown in FIG. 4A. As shown in FIG. 4A, such a membrane waveguide can include Si chip 413, $SiO_2$ lower cladding layer 414, and $Si_3N_4$ core layer 415 having one or more waveguides 418 formed therein, and can further include membrane 411, where membrane 411 is formed by an air pocket in some embodiments or by a low-refractive index/low loss material in others. By keeping the common circuitry short, the tolerance for loss in the nitride-membrane waveguide is increased. Alternatively, the full circuit can be made out of nitride membrane waveguides, although mechanical stability and thermal dissipation issues would then most likely be prohibitive.

In other cases, it may be advantageous to include a suspended waveguide with a removed substrate as is shown in FIG. 4B in some regions of the integrated circuitry to provide beam-combining for the production of a common output. Such a suspended waveguide can be used when the wavelengths become too long for a thick $SiO_2$ bottom cladding layer to be used. A suspended waveguide can also be used when the $SiO_2$ is not loss-prohibitive for the wavelengths that come from the SONOI side, but where the Si substrate would otherwise cause too much loss would cause parasitic transfer of the waveguide mode to the substrate due to its higher index.

The schematic in FIG. 4B illustrates aspects of an exemplary suspended waveguide that can be used to propagate a single combined output in an ultra-broadband photonic integrated circuit in accordance with the present invention. Such a waveguide includes a structure similar to the waveguides previously described, with a silicon chip 423, $SiO_2$ lower cladding layer 424, $Si_3N_4$ core layer 425, and $SiO_2$ upper cladding layer 429, but with all of $SiO_2$ upper and lower cladding layers 424 and 429, and $Si_3N_4$ core layer 425 being patterned so that waveguide 422 extends through the entire structure. In addition, channel 428 is patterned to expose the Si substrate 423 for etching so that the cladding and core layers and waveguide are suspended over the Si substrate. Such a structure may provide improved transmission in the SWIR and longer wavelengths due to reduced substrate leakage.

Such a suspended waveguide ultra-broadband combiner has been reduced to practice repeatedly by the inventors, as illustrated by the micrograph in FIG. 4C depicting an output facet of a suspended waveguide ultra-broadband combiner that has been reduced to practice by the inventors.

In other embodiments, an element that is both ultra-broadband (e.g., UV-MWIR or UV-LWIR) and able to split or combine the light into the UV-NIR and NIR-MWIR or NIR-LWIR bands, respectively, can be used to create a common optical input or output of the ultra-broadband chip. One approach is illustrated in FIGS. 5A-5G and FIGS. 6A/6B. Although those figures assume that the incoming beams from different spectral bands (e.g., produced by on-chip lasers) are combined to form a common output beam, by providing input form the opposite direction the same types of cross and bar, duplexer, and AWG configurations can also be used to split an input beam whose light contains components from multiple spectral bands.

As illustrated in FIGS. 5A-5G, a combined ultra-broadband photonic integrated circuit in accordance with the present invention can include various functionalities, such as the use of lasers to generate light at different wavelengths, residing on multiple regions of the photonic integrated circuit chip, with each region having various optoelectronic components and waveguides being configured to transmit in a specified wavelength range as described with respect to FIGS. 3A-3C.

Thus, in a similar manner as in FIG. 3A, the embodiment shown in FIG. 5A incorporates arrays of lasers emitting at wavelengths spanning the visible to the NIR on the NOI region 501a of the chip and lasers emitting at wavelengths spanning the SWIR to the MWIR in the SONOI region 501b of the chip.

The output of each of these laser arrays is carried by corresponding NOI and SONOI waveguides appropriate to the particular wavelength bands to a multiplexer such as arrayed waveguide grating (AWG) 502 shown in more detail in FIG. 5B. AWG 502 receives the optical signals having a plurality of wavelengths from a plurality of optical waveguides 502a coupled thereto and outputs those multiple wavelengths as a multiplexed signal via a single waveguide 502b. The multiplexed signal from the output waveguides 502b is then fed into a duplexer, such as adiabatic coupler duplexer 503 shown in more detail in FIG. 5C, which combines the beams from each set of bands generated on the SOI and SONOI regions of the chip.

Figure 6A:
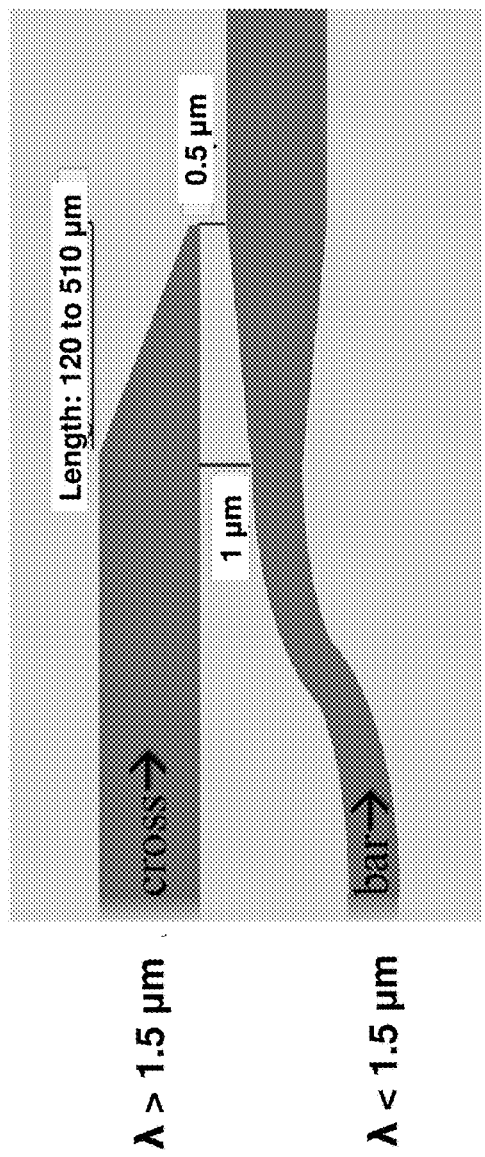
FIG. 6A illustrates an exemplary "cross and bar" ultra-broadband beam combiner that can be used in an ultra-broadband photonic integrated circuit in accordance with the present invention.

The outputs from the adiabatic coupler duplexers are then fed into a beam combiner such as ultra-broadband combiner 504 shown in FIG. 5E and in more detail in FIG. 6A. As illustrated in FIGS. 5E and 6A, such a beam combiner can include a "bar" section, which broadens as it approaches the output, and a "cross" section, which tapers to a narrow tip and is separated from the "bar" section by a narrow gap.

Beam combiners 503 and 504 operate by the same adiabatic coupling mechanism. The spectral bandwidths of duplexer 503 are limited only by the material absorption in each NOI and SONOI waveguide type. In contrast, ultra-broadband combiner 504 is capable of combining wavelengths spanning UV to MWIR because of the combined roles of the waveguide platform and the coupler, though its transmission band can be extended by using a membrane or suspended waveguide such as those described above with respect to FIGS. 4A and 4B in order to combine light from the NOI and SONOI waveguides with low loss.

Thus, unlike any approach discussed in the prior art, the ultra-broadband photonic integrated circuit platform in accordance with the present invention allows beams incoming from two types of low loss waveguides in the UV to NIR range and in the NIR to MWIR range to be combined on a single chip. Therefore, light sources and beam combiners within these ranges can be integrated on the same chip with low losses in both broad bands. The ultra-broadband combiner 504, which is compatible with this platform, combines the outputs from each waveguide type into a single output using a membrane or suspended waveguide structure such as shown in FIGS. 4A and 4B described above, to extend the transmissive band, limited by material absorption, for this device.

In most cases of interest, it is impractical to incorporate a membrane or suspended waveguide for the entire platform because the thermal dissipation and mechanical stability properties would be compromised such as to severely limit the output power and create mechanical failures that may destroy the device. By incorporating this membrane or suspended waveguide only in the ultra-broadband combiner, the thermal dissipation of the light sources is uncompromised since the light sources and any other photonic circuitry positioned before the ultra-broadband beam combiner will not have a membrane or suspended waveguide, such as in the embodiments illustrated in FIGS. 3A, 3B, and 3C. In addition, by keeping this region small, with an area less than about 50 microns by 500 microns, mechanical failure can be avoided.

These beam-combining elements have been reduced to practice by the inventors. FIGS. 5D and 5F are top-view micrographs of such beam-combining elements that have been reduced to practice by the inventors, with FIG. 5D illustrating a reduced-to-practice embodiment of adiabatic coupler duplexer 503 and FIG. 5F illustrating a reduced-to-practice embodiment of ultra-broadband combiner 504. The beam is output through an output facet such as the output facet illustrated in FIG. 5G, which is a cross-sectional view micrograph of the output facet of the ultra-broadband beam combiner that has been reduced to practice by the inventors herein. See Eric J. Stanton, Martijn J. R. Heck, Jock Bovington, Alexander Spott, and John E. Bowers, "Multi-octave spectral beam combiner on ultra-broadband photonic integrated circuit platform," *OSA Optics Express*, vol. 23, no. 9, pp. 11272-11283 (2015).

In alternative embodiments, other beam-combining structures can be included on the integrated chip, e.g., to combine all of the sources emitting in Band 1 into a single Band 1 waveguide, using beam combination techniques based on, e.g., adiabatic coupler duplexers, multi-mode interference couplers, echelle gratings and arrayed-waveguide gratings, and combination of the outputs from all the sources emitting in Band 2 into a single Band 2 waveguide, also using e.g., one of the listed techniques. Preferably the combiner should be made short to prevent optical losses due to scattering and/or material absorption. In some embodiments, the silicon oxide cladding can also be etched away, e.g., using well-known MEMS techniques such as those described in Long Chen, Christopher R. Doerr, Young-Kai Chen, and Tsung-Yang Liow, "Low-Loss and Broadband Cantilever Couplers Between Standard Cleaved Fibers and High-Index-Contrast $Si_3N_4$ or Si Waveguides," *IEEE Phot. Tech, Lett.* 22, 1744 (2010), to decrease material loss for the longer wavelengths.

The concept of the bar and cross beam combiner shown in FIGS. 5E and 6A is based on the principle that wavelengths above a certain crossover wavelength (e.g., around 1.5 µm in the embodiment shown in FIGS. 5E and 6A) extend enough spatially to couple almost seamlessly from the "cross" waveguide to the "bar" waveguide, and vice versa when propagating in the opposite direction. On the other hand, wavelengths below the crossover wavelength are too short laterally to "hop the gap," so they stay inside the "bar" waveguide. Adiabatic tapering preserves the single mode operation.

Figure 6B:
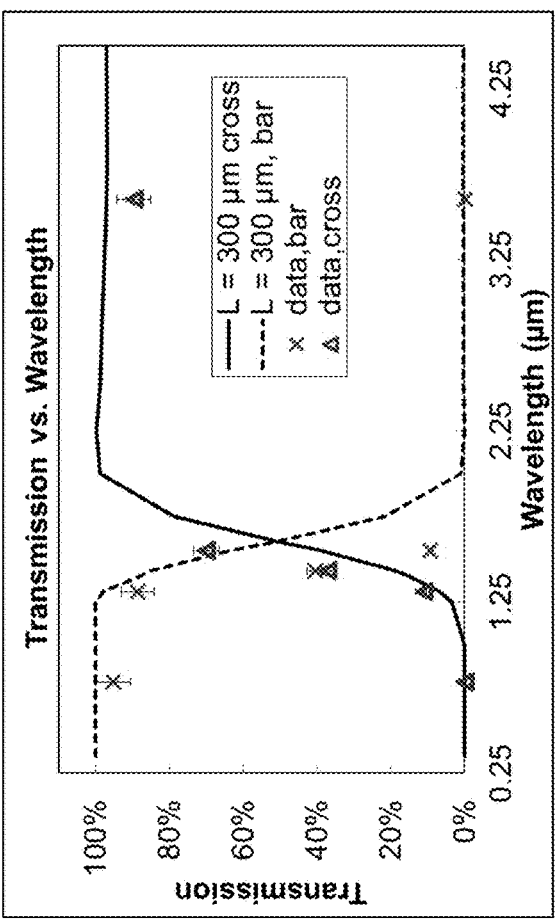
FIG. 6B illustrates the results of measurements of the transmission as a function of wavelength of beams originating in the cross and bar waveguide segments when the ultra-broadband beam combiner aspect of the invention was reduced to practice.

The results of a computer-based simulation of an ultra-broadband photonic integrated circuit having a bar and cross beam combiner in accordance with the present invention are shown as the curves in the plot in FIG. 6B, which also shows measured transmission data for beams incoming from both the cross and bar arms of the device as a function of wavelength for an experimental demonstration that reduced this aspect of the invention to practice. The simulations predict, and the experimental reduction to practice confirms, that with the exception of a finite band around the crossover wavelength, the device shows almost unity transmission of the fundamental mode for the full bandwidth of interest. The crossover wavelength is a design parameter, which can be changed and adjusted to meet the requirements for a given photonic integrated circuit.

Figure 7:
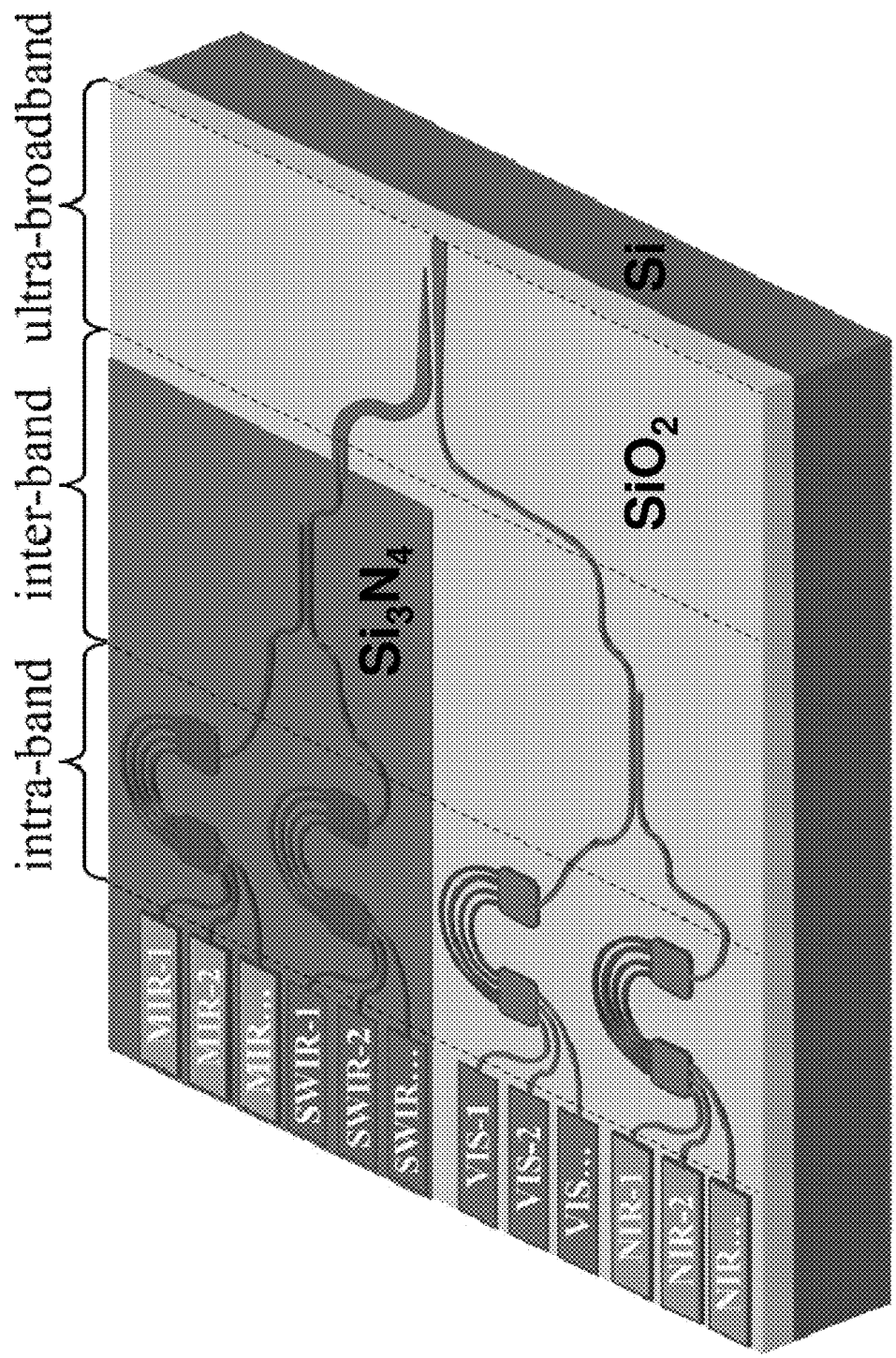
FIG. 7 is a top-view schematic diagram illustrating aspects of an exemplary embodiment of a photonic integrated circuit architecture comprising silicon-based waveguide and beam combining components together with III/V lasers emitting in multiple spectral bands bonded on a single chip to form an ultra-broadband photonic integrated circuit in accordance with the present invention.

FIG. 7 illustrates a top-view schematic of an exemplary embodiment of a photonic integrated circuit architecture comprising the silicon-based waveguide and beam combining components, along with III/V laser arrays emitting in multiple spectral bands bonded to the chip to form an ultra-broadband photonic integrated circuit in accordance with the present invention. The diagram summarizes the descriptions above by showing arrays of lasers emitting in each spectral band, AWGs to combine the beams within each band, adiabatic coupler duplexers to combine beams from different bands originating within the NOI or SONOI region of the chip, and the ultra-broadband beam combiner that combines the beams originating in the NOI and SONOI regions of the chip.

Thus, the present invention provides an ultra-broadband photonic integrated circuit platform and an ultra-broadband photonic integrated circuit that can be configured to provide a high-power ultra-broadband source that emits a single high-quality beam ($M^2$ close to one) from a common output facet.

In some embodiments, the high-power ultra-broadband source output in accordance with the present invention can be used as the input for one or more additional photonic integrated circuits or devices that also reside on the same chip, which utilize the ultra-broadband light for applications such as spectroscopy or sensors. This photonic integrated circuit or device could, for example, use a short section of the ultra-broadband waveguide as part of a sensor element.

In some embodiments, an ultra-broadband photonic integrated circuit in accordance with the present invention can be configured to integrate multiple detectors, each sensitive to a different wavelength or range of wavelengths, on a single chip to form a broadband detector array.

In other embodiments, an ultra-broadband photonic integrated circuit in accordance with the present invention can be configured to integrate multiple modulators, each operating at a different wavelength or range of wavelengths, on a single chip to form a broadband modulator array.

In still other embodiments, an ultra-broadband photonic integrated circuit in accordance with the present invention can include both passive beam-combining elements as described above together with discrete (fully processed) laser diodes or laser diode arrays to provide a hybrid integration using techniques of system-in-package, etc.

In yet other embodiments, an ultra-broadband photonic integrated circuit in accordance with the present invention can combine two or more of the laser, detector, modulator, and beam combining capabilities described above.

Although particular embodiments, aspects, and features have been described and illustrated, one skilled in the art would readily appreciate that the invention described herein is not limited to only those embodiments, aspects, and features but also contemplates any and all modifications within the spirit and scope of the underlying invention described and claimed herein. All such combinations and embodiments are within the scope of the present disclosure.

What is claimed is:

1. An ultra-broadband photonic integrated circuit platform, comprising:
    a first waveguide and a second waveguide situated on a single chip, the first waveguide being configured to transmit optical signals having wavelengths in a first spectral band ("Band 1") and the second waveguide being configured to transmit optical signals having wavelengths in a second spectral band ("Band 2"), the wavelengths in Band 1 overlapping the wavelengths in Band 2;
    wherein the first and second waveguide each comprise a heterostructure comprising a core layer, a bottom cladding layer and a top cladding layer;

wherein the same layer of material forms both a core of the first waveguide and the bottom cladding layer of the second waveguide; and wherein an overall bandwidth of the platform is greater than either Band 1 or Band 2.

2. The ultra-broadband photonic integrated circuit platform according to claim 1, wherein the first waveguide is a nitride-on-insulator (NOI) waveguide and the second waveguide is a silicon-on-nitride-on-insulator (SONOI) waveguide; and further wherein a single layer of $Si_3N_4$ forms the core of the NOI and the bottom cladding layer of the SONOI.

3. The ultra-broadband photonic integrated circuit platform according to claim 2, wherein the NOI waveguide further comprises an $SiO_2$ cladding layer disposed on the $Si_3N_4$ core.

4. The ultra-broadband photonic integrated circuit platform according to claim 1, wherein the bottom cladding layer in at least one of the first and second waveguides is silicon, silicon oxide, silicon nitride, aluminum oxide, titanium oxide, or tantalum pentoxide.

5. The ultra-broadband photonic integrated circuit platform according to claim 1, wherein the core in the one of the first and second waveguides is germanium.

6. The ultra-broadband photonic integrated circuit platform according to claim 1, wherein the top cladding layer in at least one of the first and second waveguides is silicon, silicon oxide, silicon nitride, aluminum oxide, titanium oxide, tantalum pentoxide, or air.

7. The ultra-broadband photonic integrated circuit platform according to claim 1, wherein the second waveguide is a SONOI waveguide and further includes an additional cladding layer comprising a layer of silicon nitride, titanium oxide, aluminum oxide, tantalum pentoxide, III/V semiconductor material, or germanium tin alloy.

8. The ultra-broadband photonic integrated circuit platform according to claim 1, further comprising a third waveguide on the single chip, the third waveguide being configured to transmit optical signals in a third wavelength band, the third waveguide comprising a corresponding bottom cladding layer and core layer, wherein the material forming the core of the second waveguide forms a bottom cladding layer of the third waveguide.

9. The ultra-broadband photonic integrated circuit platform according to claim 8, wherein the second waveguide comprises a silicon core and the third waveguide comprises a germanium core and a silicon bottom cladding layer, the silicon bottom cladding layer comprising the same material layer as the silicon core of the second waveguide.

10. The ultra-broadband photonic integrated circuit platform according to claim 1, wherein Band 1 comprises wavelengths in the ultraviolet (UV) to near-infrared (NIR) and Band 2 comprises wavelengths in the NIR to midwave infrared (MWIR).

11. The ultra-broadband photonic integrated circuit platform according to claim 1, further comprising a beam-combining element configured to receive optical signals from the first and second waveguides and to output a single optical beam combining all of the wavelengths in Band 1 and Band 2.

12. The ultra-broadband photonic integrated circuit platform according to claim 11, wherein the beam-combining element includes a membrane waveguide.

13. The ultra-broadband photonic integrated circuit platform according to claim 11, wherein the beam-combining element includes a suspended waveguide.

14. An ultra-broadband photonic integrated circuit, comprising:

a single chip, a first region of the chip containing at least one active and/or passive first optoelectronic device element operating at wavelengths in a first spectral band ("Band 1"), the first optoelectronic device elements being coupled to corresponding first waveguides configured to transmit in Band 1, and a second region of the chip containing at least one active and/or passive second optoelectronic device element operating at wavelengths in a second spectral band ("Band 2"), the second optoelectronic device elements being coupled to corresponding second waveguides configured to transmit in Band 2, the wavelengths in Band 1 overlapping the wavelengths in Band 2;

wherein the first and second waveguides each comprise a corresponding heterostructure comprising a core layer and a cladding layer;

wherein the same layer of material forms both a core of at least one of the first waveguides and a cladding layer of at least one of the second waveguides; and wherein the circuit can operate at wavelengths in a spectral band broader than either Band 1 or Band 2.

15. The ultra-broadband photonic integrated circuit according to claim 14, wherein the first waveguides are nitride-on-insulator (NOI) waveguides and the second waveguides are silicon-on-nitride-on-insulator (SONOI) waveguides; and further wherein a single layer of $Si_3N_4$ forms the core of the NOI and the cladding of the SONOI waveguides.

16. The ultra-broadband photonic integrated circuit according to claim 14, wherein the NOI waveguide further comprises an $SiO_2$ cladding layer deposited on the $Si_3N_4$ core.

17. The ultra-broadband photonic integrated circuit according to claim 14, wherein Band 1 comprises wavelengths in the ultraviolet (UV) to near-infrared (NIR) and Band 2 comprises wavelengths in the NIR to midwave infrared (MWIR).

18. The ultra-broadband photonic integrated circuit according to claim 14, further comprising a beam-combining element configured to receive optical signals in Band 1 from one of the first waveguides and in Band 2 from one of the second waveguides and to output a single optical beam combining all of the wavelengths in Band 1 and Band 2.

19. The ultra-broadband photonic integrated circuit according to claim 18, wherein the beam-combining element is an ultra-broadband combiner.

20. The ultra-broadband photonic integrated circuit according to claim 18, wherein the beam-combining element includes a membrane waveguide.

21. The ultra-broadband photonic integrated circuit according to claim 18, wherein the beam-combining element comprises a suspended waveguide.

22. An ultra-broadband photonic integrated circuit, comprising:

a first light-emitting device bonded to an upper surface of a first waveguide circuit, the first light-emitting device being configured to emit light having wavelengths in a first spectral band ("Band 1") and the waveguides in the first waveguide circuit being configured to transmit light having wavelengths in Band 1; and a second light-emitting device bonded to an upper surface of a second waveguide circuit, the second light-emitting device being configured to emit light having wavelengths in a second spectral band ("Band 2") and the waveguides in the second waveguide circuit being configured to transmit light having wavelengths in Band 2, the wavelengths in Band 1 overlapping the wavelengths in Band 2;

wherein the first and second waveguide circuits are situated on a single chip, the waveguides in the first and second waveguide circuits each comprising a heterostructure comprising a core layer and a cladding layer, the same layer of material forming both a core of waveguides in the first waveguide circuit and a cladding layer of waveguides in the second waveguide circuit; and wherein the integrated circuit can operate at wavelengths in a spectral band broader than either Band 1 or Band 2.

23. The ultra-broadband photonic integrated circuit according to claim 22, wherein at least one of the first and second light-emitting devices is a III/V semiconductor laser.

24. The ultra-broadband photonic integrated circuit according to claim 22, wherein the waveguides in the first waveguide circuit are nitride-on-insulator (NOI) waveguides and the waveguides in the second waveguide circuit are silicon-on-nitride-on-insulator (SONOI) waveguides, wherein a single layer of $Si_3N_4$ forms the core of the NOI waveguides and the cladding of the SONOI waveguides.

25. The ultra-broadband photonic integrated circuit according to claim 24, wherein the second light-emitting device is a III/V semiconductor laser comprising at least one III/V active material layer, and further wherein the at least one active material layer and the underlying SONOI waveguide form a hybrid waveguide configured to generate a lasing optical mode that is shared between the SONOI waveguide and the III/V active material.

26. The ultra-broadband photonic integrated circuit according to claim 22, further comprising at least one beam-combining element configured to receive optical signals from a waveguide transmitting in Band 1 and waveguide transmitting in Band 2 and to output a single optical beam combining all of the wavelengths in Band 1 and Band 2.

* * * * *